(12) United States Patent
Breon et al.

(10) Patent No.: US 10,619,056 B2
(45) Date of Patent: Apr. 14, 2020

(54) CORROSION INHIBITORS AND COATING COMPOSITIONS CONTAINING THE SAME

(71) Applicant: PPG Industries Ohio, Inc., Cleveland, OH (US)

(72) Inventors: Jonathan Paul Breon, Pittsburgh, PA (US); Ljiljana Maksimovic, Allison Park, PA (US); Robert Ennis Jennings, Ellwood City, PA (US); Joseph Burchick, Baden, PA (US); John Robert Schneider, Sharpsburg, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 286 days.

(21) Appl. No.: 14/844,023

(22) Filed: Sep. 3, 2015

(65) Prior Publication Data

US 2017/0066927 A1    Mar. 9, 2017

(51) Int. Cl.
| | |
|---|---|
| *C09D 5/00* | (2006.01) |
| *C09D 5/08* | (2006.01) |
| *C23F 11/18* | (2006.01) |
| *C23F 11/12* | (2006.01) |

(52) U.S. Cl.
CPC .............. *C09D 5/086* (2013.01); *C09D 5/00* (2013.01); *C09D 5/084* (2013.01); *C23F 11/122* (2013.01); *C23F 11/18* (2013.01)

(58) Field of Classification Search
None
See application file for complete search history.

(56) References Cited

U.S. PATENT DOCUMENTS

| | | | |
|---|---|---|---|
| 4,101,587 A | | 7/1978 | Moedritzer |
| 4,870,040 A | | 9/1989 | Job |
| 5,011,762 A | | 4/1991 | Lee et al. |
| 5,120,356 A | | 6/1992 | Phillips et al. |
| 5,458,678 A | | 10/1995 | Armstrong et al. |
| 5,565,416 A | * | 10/1996 | Wu .......................... C09K 8/06 507/102 |
| 5,591,381 A | * | 1/1997 | Walker ................... C08G 16/02 106/14.17 |
| 5,712,236 A | * | 1/1998 | Bolkan .................. C11D 1/002 510/255 |
| 6,040,054 A | | 3/2000 | Odashima et al. |
| 7,842,127 B2 | | 11/2010 | Malwitz |
| 8,231,970 B2 | | 7/2012 | Walters et al. |
| 8,628,689 B2 | | 1/2014 | Visser et al. |
| 2007/0048540 A1 | | 3/2007 | Ragunathan et al. |
| 2007/0048550 A1 | | 3/2007 | Millero et al. |
| 2007/0069182 A1 | | 3/2007 | Cassidy et al. |
| 2007/0088111 A1 | | 4/2007 | Maksimovic et al. |
| 2007/0190259 A1 | | 8/2007 | Bittner et al. |
| 2007/0275256 A1 | | 11/2007 | Ragunathan et al. |
| 2008/0000383 A1 | | 1/2008 | Nagai et al. |
| 2012/0128989 A1 | | 5/2012 | Richert et al. |
| 2013/0040799 A1 | | 2/2013 | Schrems et al. |
| 2014/0116708 A1 | * | 5/2014 | Wadekar .................. C09K 8/74 166/307 |
| 2015/0072161 A1 | | 3/2015 | Mayo et al. |
| 2015/0132590 A1 | * | 5/2015 | De Graeve ............. B05D 7/14 428/457 |

FOREIGN PATENT DOCUMENTS

| | | | |
|---|---|---|---|
| CN | 1234821 A | 11/1999 | |
| CN | 102026931 A | 4/2011 | |
| DE | 102004001385 A1 | 8/2005 | |
| EP | 0593230 A1 | 4/1994 | |
| JP | 2006142157 A | * 6/2006 | |
| JP | 2006299356 A | * 11/2006 | |
| JP | WO 2007037045 A1 | * 4/2007 | ............ C23F 11/149 |
| RU | 2272127 C1 | 3/2006 | |
| WO | 9946338 | 9/1999 | |
| WO | 0224344 A2 | 3/2002 | |
| WO | 0224344 A3 | 3/2002 | |
| WO | 2013171579 A1 | 11/2013 | |
| WO | 2014188390 A1 | 11/2014 | |

OTHER PUBLICATIONS

Derwent English abstract of JP 2006142157 A.*
Derwent English abstract of JP 2006299356 A.*
Derwent English abstract of WO2007037045.*
Li Artcile Applied Surface Science 254 5574-5586 (2008).*
CPLUS ACC No Kartha Article (1967).*
Forsyth Caplus Abstract (2004).*
Kartha 2 Indian Academy of Sciences § A vol. 66 Issue 6 pp. 319-324 (1967).*
Rare Earth-Based Corrosion Inhibitors_ M_Forsyth_pp. 1 & 33 Elsevier 2014.*
Cost of Sodium Salicylate from Scifinder 2019.*
R. Rosliza et al., "Study on the effect of vanillin on the corrosion inhibition of aluminum alloy", J. Appl. Electrochem., Jan. 14, 2010, pp. 833-840, vol. 40, No. 4.
Selim, Inhibitive Effect of Some Aldehydes on Corrosion of Al-3Mg Alloy in Acid Solutions, J. Mater. Sci. Technol., 1998, pp. 313-319, vol. 14, Physical Chemistry Dept., National Research Center, Dokki, Cairo, Egypt.
Computer generated English translation of DE102004001385.
Computer generated English translation of RU2272127.

* cited by examiner

*Primary Examiner* — Kenneth J Stachel
(74) *Attorney, Agent, or Firm* — Justin P. Martinchek

(57) ABSTRACT

A corrosion inhibitor can include (a) an inorganic alkali and/or alkaline earth metal compound and (b) an aldehyde and/or ketone component comprising at least one aromatic ring comprising a ketone and/or aldehyde group and at least one pendant group represented by —$OR^1$. Each $R^1$ is independently selected from hydrogen, an alkyl group, or an aryl group. The coating composition can be used in a multi-layer coating with additional coating layers. Methods of preparing coating compositions with corrosion inhibitors and substrates at least partially coating with such compositions are also included.

28 Claims, No Drawings

"CORROSION INHIBITORS AND COATING COMPOSITIONS CONTAINING THE SAME

FIELD OF THE INVENTION

The present invention relates to corrosion inhibitors, coating compositions containing corrosion inhibitors, methods of preparing the coating compositions, and substrates at least partially coated with such compositions.

BACKGROUND OF THE INVENTION

Metallic substrates, such as cold-rolled steel found in springs and coils, are susceptible to corrosion, especially when exposed to certain environmental conditions. To prevent or reduce the corrosion of a metallic substrate, a coating containing a corrosion inhibitor is typically applied over the surface of the substrate. Additional coating layers can then be applied over the corrosion inhibiting coating layer. These additional coating layers can provide other desirable properties including color, abrasion resistance, and chemical resistance.

Considerable efforts have been expended in developing corrosion inhibitors that reduce or prevent corrosion of metallic substrates. While these corrosion inhibitors have been found to reduce corrosion of metallic substrates, it is desirable to provide improved corrosion inhibitors that more effectively reduce or prevent corrosion. In addition, currently available corrosion inhibitors typically utilize chromium compounds; however, the use of chromium results in the production of waste streams that pose environmental concerns and disposal issues. As such, it is desirable to provide improved chrome-free corrosion inhibitors.

SUMMARY OF THE INVENTION

The present invention is directed to a corrosion inhibitor that comprises: (a) an inorganic alkali and/or alkaline earth metal compound; and (b) an aldehyde and/or ketone component comprising at least one aromatic ring comprising a ketone and/or aldehyde group and at least one pendant group represented by —$OR^1$. Each $R^1$ is independently selected from hydrogen, an alkyl group, or an aryl group.

The present invention is also directed to a coating composition that comprises: (a) the previously described corrosion inhibitor; and (b) a film-forming resin.

In addition, the present invention is directed to a method of preparing a coating composition that includes mixing: (a) an aldehyde and/or ketone component comprising at least one aromatic ring comprising a ketone and/or aldehyde group and at least one pendant group represented by —$OR^1$ with each $R^1$ independently selected from hydrogen, an alkyl group, or an aryl group; (b) an inorganic alkali and/or alkaline earth metal compound; and (c) a film-forming resin. Components (a) and (b) can form a corrosion inhibitor in-situ.

Moreover, the present invention is further directed to a multi-layer coating. The multi-layer coating includes: (a) a first coating layer prepared from the previously described coating composition; and (b) a second coating layer applied over the first coating layer that is prepared from a coating composition that is different from (a) and which comprises a second film-forming resin.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" corrosion inhibitor, "an" aldehyde, "a" ketone, "an" inorganic alkali and/or alkaline earth metal compound, "a" film-forming resin, and the like refer to one or more of any of these items.

As indicated, the present invention is directed to corrosion inhibitors and coating compositions that contain corrosion inhibitors. As used herein, the term "corrosion inhibitor" refers to a material, substance, compound, complex, or component that reduces the rate or severity of corrosion of a surface on a metal or metal alloy substrate. The term "substrate" refers to any material with a surface that can be coated with a film, including bare substrates as well as substrates that already have a coating deposited thereon.

The corrosion inhibitors of the present invention can comprise an aldehyde and/or a ketone component, and an inorganic alkali and/or alkaline earth metal compound. An "aldehyde component" refers to a monomer comprising at least one aldehyde group —C(=O)H, and a "ketone component" refers to a monomer comprising a ketone group —C(=O)$R^2$, where $R^2$ is a carbon-containing substituent including, but not limited to, an alkyl group or an aryl group, which are defined in further detail herein. The aldehyde and/or a ketone component also includes a non-volatile aldehyde and/or a ketone component. A "non-volatile aldehyde component" and "non-volatile ketone component" refers to an aldehyde and ketone component with a vapor pressure that is 140 pascals (Pa) or less at 25° C., as determined by ASTM D2879-10. Volatile components that are typically removed from the composition and which are not used as a non-volatile aldehyde and/or a ketone component include, but are not limited to, acetone, methyl amyl ketone, methyl ethyl ketone, methyl propyl ketone, methyl isoamyl ketone, cyclohexanone, diacetone alcohol, methyl isobutyl ketone, diisobutyl ketone, diisoamyl ketone, diamyl ketone, isophorone, pentoxone, and C-11 ketone.

The aldehyde and/or ketone component can have a calculated molecular weight of less than 500 g/mole. The aldehyde and/or ketone component can also have a calculated molecular weight of less than 400 g/mole or less 300 g/mole.

Further, the aldehyde and/or ketone component used with the present invention comprises at least one aromatic ring comprising an aldehyde group and/or a ketone group. Thus, the aldehyde and/or ketone component comprises at least one aromatic ring having an aldehyde group represented by —C(=O)H, and/or a ketone group represented by —C(=O)$R^2$ in which $R^2$ is described above. As used herein, the term "aromatic" refers to a cyclically conjugated hydrocarbon with a stability (due to delocalization) that is significantly greater than that of a hypothetical localized structure. The aromatic ring can include aromatic carbocyclic or heteroaromatic ring structures. An "aromatic carbocyclic ring" refers to an aromatic ring with the aromatic group completely formed by bonded carbon atoms, and a "heteroaromatic ring" refers to an aromatic ring with at least one carbon atom of the aromatic group replaced by a heteroatom such as nitrogen, oxygen, sulfur, or a combination thereof.

In addition, the aromatic ring structure can comprise a monocyclic aromatic ring, a bicyclic aromatic ring, a polycyclic aromatic ring, or a combination thereof. A "monocyclic aromatic ring" refers to a single aromatic cyclic ring containing 3 to 18 carbon atoms such as 5 to 6 carbon atoms (i.e., a 5- or 6-membered ring). A "bicyclic aromatic ring" refers to two aromatic rings, each aromatic ring independently containing 3 to 18 carbon atoms such as 5 to 6 carbon atoms, in which one, two, or more atoms are shared between the two aromatic rings. A "polycyclic aromatic ring" refers to three or more aromatic rings, each aromatic ring independently containing 3 to 18 carbon atoms such as 5 to 6 carbon atoms, in which one, two, or more atoms of each aromatic ring are shared with at least one other aromatic ring that forms the polycyclic structure. It is appreciated that two or more monocyclic, bicyclic, and/or polycyclic aromatic rings can be used alone or bonded together to form the aldehyde and/or ketone component.

As previously described, the aldehyde and/or ketone component used with the present invention comprises an aromatic ring having an aldehyde and/or ketone group. A ketone group can be formed as part of the aromatic ring or an aldehyde and/or ketone group can be bonded to the aromatic ring as a pendant group (i.e., a chemical group other than hydrogen that is attached to and extends out from the aromatic ring). The aldehyde and/or ketone component also comprises at least one other pendant group bonded to the aromatic ring that is represented by —$OR^1$ in which each R' is independently selected form an alkyl group, hydrogen, or aryl group. In some instances, the aldehyde and/or ketone component does not include carboxylic acid groups (i.e. is completely free of carboxylic acid groups).

The term "alkyl" as used herein refers to an aliphatic (i.e., non-aromatic) linear, branched, and/or cyclic monovalent hydrocarbon radical. The alkyl group may include, but is not limited to, an aliphatic linear or branched $C_1$-$C_{30}$ monovalent hydrocarbon radical, or an aliphatic linear or branched $C_1$-$C_{20}$ monovalent hydrocarbon radical, or an aliphatic linear or branched $C_1$-$C_{10}$ monovalent hydrocarbon radical. The alkyl group may also include, but is not limited to, an aliphatic cyclic $C_3$-$C_{19}$ monovalent hydrocarbon radical, or an aliphatic cyclic $C_3$-$C_{12}$ monovalent hydrocarbon radical, or an aliphatic cyclic $C_5$-$C_7$ monovalent hydrocarbon radical.

Recitations of "linear, branched, or cyclic" groups, such as linear, branched, or cyclic alkyl are herein understood to include: a monovalent methyl group; groups that are linear, such as straight-chained $C_2$-$C_{30}$ alkyl groups; groups that are appropriately branched, such as branched $C_3$-$C_{30}$ alkyl groups, refers to an alkyl chain with a hydrogen replaced by a substituent such as an alkyl group that branches or extends out from a straight alkyl chain; and groups that are cyclic, such as cyclic $C_3$-$C_{19}$ alkyl groups, refers to a closed ring structure.

The alkyl group can be unsubstituted or substituted. A substituted alkyl group refers to an alkyl group where at least one hydrogen thereof has been optionally replaced or substituted with a group that is other than hydrogen. Such groups can include, but are not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, and hydrocarbyl groups such as an alkyl group for example.

The term "aryl" refers to a substituent derived from an aromatic ring, such as a phenyl group for example. The aryl group can be derived from a monocyclic aromatic ring, a bicyclic aromatic ring, or a polycyclic aromatic ring. The aryl group can also include a heteroaryl group in which at least one carbon atom of the aromatic group is replaced by a heteroatom such as nitrogen, oxygen, sulfur, or a combination thereof. The aryl group can also include a substituted aryl group where at least one hydrogen thereof has been optionally replaced or substituted with a group that is other than hydrogen. Such groups can include, but are not limited to, any of the substituted groups previously described.

The aldehyde and/or ketone component can comprise at least one, at least two, at least three, or at least four additional pendant groups bonded to the aromatic ring that are represented by —$OR^1$ as defined above. For example, the aldehyde and/or ketone component used with the present invention can comprise an aromatic ring having an aldehyde and/or ketone group and two pendant groups represented by —$OR^1$ in which $R^1$ is a hydrogen for one of the pendant groups and an alkyl group for the second pendant group. As such, the aldehyde and/or ketone component used with the present invention can comprise an aromatic ring having an aldehyde and/or ketone group, a pendant hydroxyl group (—OH), and a pendant alkoxy group (—O-alkyl). It is appreciated that the pendant groups represented by —$OR^1$ can be bonded to multiple aromatic rings such as when a bicyclic or polycyclic aromatic ring is used or when multiple monocyclic rings are used.

The aromatic ring(s) of the aldehyde and/or ketone component may be further substituted with one or more groups different from those described above. Such groups can include, but are not limited to, alkyl groups, aryl groups, and other optional substituted groups as previously defined.

It has been found that the additional pendant groups represented by —$OR^1$ can help further improve the corrosion inhibiting properties of the corrosion inhibitor described herein. For instance, it has been found that an aldehyde and/or ketone component comprising an aromatic ring having an aldehyde and/or ketone group, a pendant hydroxyl group, and a pendant alkoxy group can provide superior corrosion resistance when used in a coating deposited over a substrate. The hydroxyl and alkoxy groups, as well as any of the other additional functional groups, can be bonded to the aromatic ring at any position. For example, the pendant groups represented by —$OR^1$ can be bonded to the ortho, meta, and/or para position on a six-membered. The positioning of functional groups at certain locations on the aromatic ring can further increase the corrosion resistant properties of the corrosion inhibitor.

Non-limiting examples of aldehyde components that can be used with the corrosion inhibitors of the present invention include 2-hydroxybenzaldehyde, 3,5-di-tert-butyl-2-hydroxybenzaldehyde, 2-hydroxy-1-napthaldehyde, 2-hydroxy-3-methoxybenzaldehyde, 2-hydroxy-3-ethoxybenzaldehyde, 2-hydroxy-4-methoxybenzaldehyde, 2,3-dihydroxybenzaldehyde, 2,4-dihydroxybenzaldehyde, 3-methoxy-4-hydroxybenzaldehyde, 3,5-methoxy-4-hydroxybenzaldehyde, 3,4-dihydroxybenzaldehyde, and combinations thereof.

Non-limiting examples of ketone components that can be used with the corrosion inhibitors of the present invention include maltol, 2,4-dihydroxybenzophenone, 2-hydroxy-4-methoxybenzophenone, 2-hydroxy-4-n-octoxybenzophenone, 2,2',4,4'-tetrahydroxybenzophenone, and combinations thereof. It is appreciated that a ketone component can be used with or without an aldehyde component to form the corrosion inhibitors of the present invention.

The aldehyde and/or ketone component can comprise from 1 to 50 weight % of the corrosion inhibitor, based on the total solids weight of the corrosion inhibitor. The aldehyde and/or ketone component can also comprise from 5 to 30 weight % or from 8 to 20 weight % of the corrosion inhibitor, based on the total solids weight of the corrosion inhibitor.

As indicated, the corrosion inhibitor can also include an inorganic alkali and/or alkaline earth metal compound. As used herein, the term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb) and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg) and strontium (Sr).

Further, an "inorganic alkali and/or alkaline earth metal compound" refers to a compound comprising an alkali and/or alkaline earth metal and at least one other atom that is not an alkali and/or alkaline earth metal, and which does not include a direct bond between a carbon atom of an organic compound and the alkali and/or alkaline earth metal. In some other instances, the inorganic alkali and/or alkaline earth metal compound does not include any carbon atoms (i.e., completely free of carbon atoms). Any of the alkali and alkaline earth metals can be used to form the inorganic alkali and/or alkaline earth metal compound, such as magnesium for example. The at least one other atom that is also used to form the inorganic alkali and/or alkaline earth metal compound can include various types of atoms that do not include alkali and/or alkaline earth metals. For instance, the alkali and/or alkaline earth metals and the at least one other atom can be selected to form a salt.

The inorganic alkali and/or alkaline earth metal compound can also have, but is not limited to, a B.E.T. specific surface area of at least 1 square meter per gram, such as from 1 to 500 square meters per gram, or, in some cases, from 1 to 30 square meters per gram, or, in other cases, from 50 to 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938). Such surface areas can be obtained from various methods. For example, magnesium oxide having a surface area from 50 to 250 square meters per gram can be produced through light burning calcination at a temperature of 700° C. to 1000° C. Alternatively, magnesium oxide having surface areas of 1 to 30 square meters per gram can be produced through hard burning calcination from 1000° C. to 1500° C.

Non-limiting examples of inorganic alkali and/or alkaline earth metal compounds include alkali and/or alkaline earth metal hydroxides, alkali and/or alkaline earth metal oxides, alkali and/or alkaline earth metal iodides, alkali and/or alkaline earth metal phosphides, alkali and/or alkaline earth metal phosphates, alkali and/or alkaline earth metal polyphosphates, alkali and/or alkaline earth metal sulfates, alkali and/or alkaline earth metal sulfides, alkali and/or alkaline earth metal chlorides, alkali and/or alkaline earth metal bromides, alkali and/or alkaline earth metal fluorides, alkali and/or alkaline earth metal nitrates, alkali and/or alkaline earth metal borates, alkali and/or alkaline earth metal silicates, alkali and/or alkaline earth metal cyanamides, alkali and/or alkaline earth metal carbonates, alkali and/or alkaline earth metal bicarbonates, alkali and/or alkaline earth metal oxalates, alkali and/or alkaline earth metal carboxylates, and combinations thereof.

Specific non-limiting examples of inorganic alkali and/or alkaline earth metal compounds include magnesium oxide, magnesium hydroxide, magnesium carbonate, magnesium phosphate, magnesium silicate, calcium oxide, calcium hydroxide, calcium carbonate, calcium phosphate, calcium silicate, and combinations thereof.

The inorganic alkali and/or alkaline earth metal compound can comprise from 50 to 99 weight % of the corrosion inhibitor, based on the total solids weight of the corrosion inhibitor. The inorganic alkali and/or alkaline earth metal compound can also comprise from 60 to 95 weight % or from 70 to 90 weight % of the corrosion inhibitor, based on the total solids weight of the corrosion inhibitor.

The aromatic aldehyde and/or ketone component and the inorganic alkali and/or alkaline earth metal compound can be combined such that the molar ratio of the aromatic aldehyde and/or ketone to the alkali and/or alkaline earth metal is 2:1 or less. That is, the corrosion inhibitor can comprise 2 moles or less of an aromatic aldehyde and/or ketone for every 1 mole of an alkali and/or alkaline earth metal. For example, the corrosion inhibitor can comprise 2 moles or less of an aromatic aldehyde for every 1 mole of magnesium. The aromatic aldehyde and/or ketone component and the inorganic alkali and/or alkaline earth metal compound can also be combined such that the molar ratio of the aromatic aldehyde and/or ketone to the alkali and/or alkaline earth metal is 1.5:1 or less, 1:1 or less, 0.5:1 or less, 0.1:1 or less, 0.05:1 or less, 0.03:1 or less, 0.02:1 or less, or 0.01:1 or less.

The corrosion inhibitor can also comprise other optional components. For example, the corrosion inhibitor can also include an alkoxysilane and/or an additional metal compound that is different from the inorganic alkali and/or alkaline earth metal compound. An "alkoxysilane" refers to a silane compound with at least one alkoxy group bonded to a silicon atom. The alkoxysilane can be a trialkoxysilane such as a trimethoxysilane or a triethoxysilane. The alkoxysilane can have other functional groups including, but not limited to, an epoxy group, amino group, aryl group, vinyl group, alkyl group, (meth)acrylate group, sulfur group, ureido group, isocyanate group, and combinations thereof. As used herein, the term "(meth)acrylate" and like terms refers to both methacrylate and acrylate.

Non-limiting examples of alkoxysilanes that can be used with the corrosion inhibitors of the present invention include octyltriethoxysilane, propyltriethoxysilane, methyltriethoxysilane, methyltrimethoxysilane, hexadecyltrimethoxysilane, phenyltrimethoxysilane, phenyltriethoxysilane, vinyltriethoxysilane, vinyltrimethoxysilane, vinylmethyldimethoxysilane, gamma-methacryloxypropyltrimethoxysilane, beta-(3,4-epoxycyclohexyl)ethyltrimethoxysilane, gamma-glycidoxypropyltrimethoxysilane, gamma-glycidoxypropyltriethoxysilane, gamma-mercaptopropyltrimethoxysilane, gamma-mercaptopropyltriethoxysilane, gamma-aminopropyltriethoxysilane, gamma-aminopropyltrimethoxysilane, N-beta-(aminoethyl)-gamma-aminopropyltrimethoxysilane, bis-(gamma-trimethoxysilylpropyl)amine, delta-aminoneohexyltrimethoxysilane, N-beta-(aminoethyl)-gamma-aminopropylmethyldimethoxysilane, delta-aminoneohexylmethyldimethoxysilane, N-phenyl-gamma-aminopropyltrimethoxysilane, N-ethyl-3-trimethoxysilylmethylpropamine, gamma-ureidopropyltrialkoxysilane, gamma-ureidopropyltrimethoxysilane, gamma-isocyanato-propyltriethoxysilane, gamma-isocyanatopropyltrimethoxysilane, and combinations thereof.

The alkoxysilane can comprise from 1 to 50 weight % of the corrosion inhibitor, based on the total solids weight of the corrosion inhibitor. The alkoxysilane can also comprise from 5 to 30 weight % or from 8 to 20 weight % of the corrosion inhibitor, based on the total solids weight of the corrosion inhibitor.

The additional metal compound that is different from the inorganic alkali and/or alkaline earth metal compound can include compounds of zinc, scandium, yttrium, titanium, zirconium, vanadium, molybdenum, tungsten, manganese, iron, aluminum, lead, cerium, praseodymium, neodymium, and combinations thereof. In some examples, the corrosion inhibitor (as well as the coating composition described below) is chromium-free.

The additional metal compound that is different from the inorganic alkali and/or alkaline earth metal compound can comprise from 1 to 50 weight % of the corrosion inhibitor, based on the total solids weight of the corrosion inhibitor. The additional metal compound that is different from the inorganic alkali and/or alkaline earth metal compound can also comprise from 5 to 40 weight % or from 10 to 30 weight % of the corrosion inhibitor, based on the total solids weight of the corrosion inhibitor.

Further, the inorganic alkali and/or alkaline earth metal compound, the aldehyde and/or ketone component, the optional alkoxysilane, and the optional additional metal compound together can comprise at least 95 weight %, or at least 99 weight %, or at least 99.5 weight %, or 100 weight % of the corrosion inhibitor, based on the total solids weight of the corrosion inhibitor.

To form the corrosion inhibitor, the aldehyde and/or ketone component, the inorganic alkali and/or alkaline earth metal compound, and, optionally, the other additional components can be mixed together in the absence of free solvent to form a solid corrosion inhibitor. The corrosion inhibitor can also be formed in the presence of free solvent. For instance, the inorganic alkali and/or alkaline earth metal compound and, optionally, the additional metal compound can be dispersed in a non-aqueous media and mixed to form a slurry. The aldehyde and/or ketone component, and, optionally, the alkoxysilane can then be dissolved in the slurry. It is appreciated that the aldehyde and/or ketone component and, optionally, the alkoxysilane can first be dissolved in the non-aqueous media. The inorganic alkali and/or alkaline earth metal compound, and, optionally, the additional metal compound can then be dispersed in the non-aqueous solution to form a slurry. The final corrosion inhibitor, if suspended in water, can have a pH of greater than 6, greater than 7, or greater than 8, as determined by any pH meter known in the art.

As previously mentioned, the free solvent used to form the slurry can be a non-aqueous medium. As used herein, the term "non-aqueous medium" refers to a liquid medium comprising less than 50 weight % water, based on the total weight of the liquid medium. Such non-aqueous liquid mediums can comprise less than 40 weight % water, or less than 30 weight % water, or less than 20 weight % water, or less than 10 weight % water, or less than 5% water, based on the total weight of the liquid medium. The solvents that make up at least or more than 50 weight % of the liquid medium include organic solvents. Non-limiting examples of suitable organic solvents include polar organic solvents e.g. protic organic solvents such as glycols, glycol ether alcohols, alcohols; and volatile ketones, glycol diethers, esters, and diesters. Other non-limiting examples of organic solvents include aromatic and aliphatic hydrocarbons.

It should be appreciated that the aldehyde and/or ketone component used to form the corrosion inhibitor can be readily soluble or miscible in a non-aqueous medium. As used herein, "readily soluble or miscible in a non-aqueous medium" refers to the ability of 1 gram of the aromatic aldehyde and/or ketone component to completely dissolve or form a homogeneous mixture ("miscible") in 100 mL or less of a non-aqueous medium.

After mixing the components with free solvent to form the slurry, the solvent can be evaporated off to form a solid corrosion inhibitor. The solvent can be evaporated off using conventional techniques known in art including, but not limited to, heat treatment, vacuum treatment, and the like.

Further, the separate components that make up the corrosion inhibitor can form a complex. As used herein, a "complex" refers to an association of molecules formed by non-covalent interactions between the molecules. Alternatively, two or more of the components that make up the corrosion inhibitor can react with each other to form covalent bonds. It is appreciated that some of the components that make up the corrosion inhibitor can form a complex, while other components that are part of the same corrosion inhibitor can react to form covalent bonds.

As indicated, the present invention is also directed to a coating composition that includes a corrosion inhibitor and a film-forming resin. As used herein, a "film-forming resin" refers to a resin that can form a self-supporting continuous film on at least a horizontal surface of a substrate upon removal of any diluents or carriers present in the composition or upon curing.

The film-forming resin can include any of a variety of thermoplastic and/or thermosetting film-forming resins known in the art. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also can be carried out under ambient conditions. Once cured or crosslinked, a thermosetting resin will not melt upon the application of heat and is insoluble in solvents. As noted, the film-forming resin can also include a thermoplastic film-forming resin. As used herein, the term "thermoplastic" refers to resins that include polymeric components that are not joined by covalent bonds and, thereby, can undergo liquid flow upon heating and can be soluble in certain solvents.

Non-limiting examples of suitable film-forming resins include polyurethanes, polyesters such as polyester polyols, polyamides, polyethers, polysiloxanes, fluoropolymers, polysulfides, polythioethers, polyureas, (meth)acrylic resins, epoxy resins, vinyl resins, copolymers thereof, and mixtures thereof. Further, the term "polymer" refers to oligomers and homopolymers (e.g., prepared from a single monomer species), copolymers (e.g., prepared from at least two monomer species), terpolymers (e.g., prepared from at least three monomer species) and graft polymers. The term "resin" is used interchangeably with "polymer."

The film-forming resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. The term "reactive functional group" refers to an atom, group of atoms, functionality, or group having sufficient reactivity to form at least one covalent bond with another reactive group in a chemical reaction.

Thermosetting coating compositions typically comprise a crosslinker that may be selected from any of the crosslinkers known in the art to react with the functionality used in the coating compositions. As used herein, the term "crosslinker" refers to a molecule comprising two or more functional groups that are reactive with other functional groups and which is capable of linking two or more monomers or polymer molecules through chemical bonds. Alternatively, a thermosetting film-forming resin can be used having functional groups that are reactive with themselves; in this manner, such thermosetting resins are self-crosslinking.

Non-limiting examples of crosslinkers include phenolic resins, amino resins, epoxy resins, beta-hydroxy (alkyl) amide resins, alkylated carbamate resins, (meth)acrylates, isocyanates, blocked isocyanates, polyacids, anhydrides, organometallic acid-functional materials, polyamines, polyamides, aminoplasts, and combinations thereof.

The coating composition can comprise at least 5 weight %, at least 10 weight %, or at least 15 weight % of a film-forming resin, based on the total solid weight of the coating composition. The coating composition can also comprise up to 90 weight %, up to 70 weight %, or up to 50 weight % of a film-forming resin, based on the total solid weight of the coating composition. The coating composition can also comprise from 5 to 90 weight %, from 10 to 70 weight %, or from 15 to 50 weight % of a film-forming resin, based on the total solid weight of the coating composition.

The corrosion inhibitor that is used with the coating composition can include any of the corrosion inhibitors previously described. Further, the coating composition can comprise at least 0.1 weight %, at least 1 weight %, or at least 5 weight % of a corrosion inhibitor, based on the total solid weight of the coating composition. The coating composition can also comprise up to 50 weight %, up to 35 weight %, or up to 20 weight % of a corrosion inhibitor, based on the total solid weight of the coating composition. The coating composition can also comprise from 0.1 to 50 weight %, from 1 to 35 weight %, or from 5 to 20 weight % of a corrosion inhibitor, based on the total solid weight of the coating composition.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries. Also, additional corrosion-inhibitors can be used.

The coating composition of the present invention can be formed by first preparing a corrosion inhibitor, as described above, and then mixing the corrosion inhibitor with a film-forming resin and any of the other optional components such as a crosslinker. All the components can be mixed in a non-aqueous medium such as the non-aqueous medium previously described. The mixing can include a milling process as recognized by one skilled in the art.

Alternatively, the composition can be formed by mixing the aldehyde and/or ketone component, inorganic alkali and/or alkaline earth metal compound, optional additional components that form the corrosion inhibitor, film-forming resin, and optional components that can be used in the coating composition such as a crosslinker for example. In this method, the corrosion inhibitor is formed in-situ during the preparation of the coating composition. As used in this context, "in-situ" refers to the formation of the corrosion inhibitor while forming the coating composition at the same time. The components that make up the corrosion inhibitor can form a complex and/or react to form covalent bonds. In addition, some of the components that form the corrosion inhibitor can also interact with film-forming resin. For instance, the alkoxysilane can interact with the surface of the inorganic alkali and/or alkaline earth metal compound and a portion of the film forming resin.

After forming the corrosion inhibiting coating composition, the compositions can be applied to a wide range of substrates known in the coatings industry. For example, the coating compositions of the present invention can be applied to automotive substrates, industrial substrates, aerocraft and aerocraft components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating compositions of the present invention are particularly beneficial when applied directly to a metallic substrate or a pretreated metallic substrate. For example, the coatings of the present invention are particularly beneficial when applied to metallic springs or coils such as cold-rolled steel coils, galvanized steel coils, and aluminum coils.

The coating compositions of the present invention can be applied by any means standard in the art, such as electro-coating, spraying, electrostatic spraying, dipping, rolling, brushing, and the like. The coatings formed from the coating compositions of the present invention can be applied to a dry film thickness of 5 to 500 microns, 20 to 100 microns, or 25 to 60 microns.

The coating composition comprising the corrosion inhibitor can be applied to a substrate to form a monocoat. As used herein, a "monocoat" refers to a single layer coating system that is free of additional coating layers. Thus, the coating composition comprising the corrosion inhibitor can be applied directly to a substrate and cured to form a single layer coating, i.e. a monocoat.

Alternatively, the coating composition comprising the corrosion inhibitor can be applied to a substrate as a first coating layer along with additional coating layers, such as a second coating layer, to form a multi-layer coating system. For example, a coating composition comprising the corrosion inhibitor can be applied to a substrate as a primer and additional coating layers can be applied over the primer layer as basecoats and/or topcoats. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact, and which may be overcoated with a protective and decorative topcoat.

The additional coating layers, such as a second layer, can be formed from a coating composition that includes a film-forming resin that is the same or different from the first coating layer. The additional coating layers can be prepared with any of the film-forming resins, crosslinkers, colorants, and/or other components previously described. Further, each coating composition can be applied as a dry-on-dry process where each coating composition is dried or cured to form a coating layer prior to application of another composition coating. Alternatively, all or certain combinations of each coating composition described herein can be applied as a wet-on-wet process and dried or cured together.

It was found that the coating compositions comprising the corrosion inhibitors described herein provide good corrosion resistance when applied to a metallic substrate and cured to form a coating. The coating compositions comprising the corrosion inhibitors were found to provide good corrosion resistance when used as a single layer monocoat and when used in a multi-layer coating system. For example, the coating compositions comprising the corrosion inhibitors described herein, when used as a monocoat and in a multi-layer coating system, were found to provide good corrosion creep when exposed to an ASTM B117-11 salt-fog cabinet for 500 hours and tested according to the guidelines provided in ASTM D1654-08.

The following examples are presented to demonstrate the general principles of the invention. The invention should not be considered as limited to the specific examples presented. All parts and percentages in the examples are by weight unless otherwise indicated.

Example 1

Preparation of a Corrosion Inhibitor

A corrosion inhibitor according to the present invention was prepared from the components listed in Table 1.

TABLE 1

| Component | Weight (grams) |
|---|---|
| Magnesium oxide | 16 |
| Methyl acetate | 60 |
| o-Vanillin | 2 |
| SILQUEST ® A-1110 [1] | 2 |

[1] Aminopropyltrimethoxy silane, commercially available from Momentive Performance Materials.

The corrosion inhibitor was prepared by suspending 16 grams of magnesium oxide in 60 grams of methyl acetate. After forming the slurry, 2 grams of o-vanillin (also known as 2-hydroxy-3-methoxy benzaldehyde) was added to the mixture and stirred for 15 min. The mixture turned a bright yellow-green color upon addition of the o-vanillin. Next, 2 grams of SILQUEST® A-1110 was added to the mixture and stirred for an additional 15 mins. The mixture was then placed in an oven and heated at 60° C. for 30 mins. to remove solvent.

Example 2

Preparation of a Corrosion Inhibitor

A corrosion inhibitor according to the present invention was prepared from the components listed in Table 2.

TABLE 2

| Component | Weight (grams) |
|---|---|
| Magnesium oxide | 16 |
| o-Vanillin | 2 |
| SILQUEST ® A-1110 [1] | 2 |

The corrosion inhibitor was prepared by mixing 16 grams of magnesium oxide and 2 grams of o-vanillin on a Thinky ARE-310 planetary mixer for 30 seconds. Next, 2 grams of SILQUEST® A-1110 was added and the mixture was milled for another 30 seconds. The resulting bright yellow-green powder was then placed in oven and heated at 60° C. for 30 mins.

Examples 3-4

Preparation of a Coating Composition

Two (2) coating compositions according to the present invention were prepared from the components listed in Table 3.

TABLE 3

| Component | Example 3 Weight (grams) | Example 4 Weight (grams) |
|---|---|---|
| Corrosion Inhibitor of Example 1 | 7.54 | 0 |
| Corrosion Inhibitor of Example 2 | 0 | 7.54 |
| MONARCH ® 1300 [2] | 0.06 | 0.06 |
| TIONA ® 595 [3] | 10.93 | 10.93 |
| ASP ® 200 Kaolin [4] | 3.48 | 3.48 |
| BARTEX ® 10 [5] | 15.66 | 15.66 |
| HEUCOPHOS ® ZP-10 [6] | 5.93 | 5.93 |
| SILQUEST ® A-187 [7] | 0.58 | 0.58 |
| ANTI-TERRA ® U-100 [8] | 0.10 | 0.10 |
| NUOSPERSE ® 657 [9] | 0.36 | 0.36 |
| Polyester polyol [10] | 11.13 | 11.13 |
| EPON ® 1001F [11] | 1.94 | 1.94 |
| Polybutylacrylate | 0.16 | 0.16 |
| Acrylic Microgel [12] | 2.84 | 2.84 |
| ZOLDINE ® MS-PLUS [13] | 1.94 | 1.94 |
| GXH-1080 [14] | 5.26 | 5.26 |
| ADDITOL ® VXW6503 [15] | 0.39 | 0.39 |
| Isobutyl alcohol | 0.10 | 0.10 |
| Butyl acetate | 6.50 | 6.50 |
| PM acetate [16] | 1.27 | 1.27 |
| Methyl amyl ketone | 1.27 | 1.27 |
| Tertiary butyl acetate | 7.32 | 7.32 |
| Methyl acetate | 10.08 | 10.08 |
| Acetone | 5.06 | 5.06 |

[2] Carbon black available from Cabot Specialty Chemicals.
[3] Titanium dioxide available from Cristal.
[4] Clay available from BASF Corp.
[5] Barium sulfate available from TOR Minerals International, Inc.
[6] Zinc phosphate available from Heubach GmbH.
[7] Siloxane additive available from Momentive Performance Materials.
[8] Dispersant available from Altana A.G.
[9] Dispersant available from Elementis Specialties Inc.
[10] Polyester polyol polymer available from PPG Industries.
[11] Epoxy polymer available from Elementis Specialties Inc.
[12] Non-aqueous polyacrylate dispersion available from PPG Industries.
[13] Oxazolidine available from Dow Chemical Company.
[14] Solvated polyisocyanate available from PPG Industries.
[15] Flow additive available from Allnex Belgium SA/NV.
[16] Propylene glycol monomethyl ether acetate available from Eastman.

Each of the coating compositions listed in Table 3 were prepared by dispersing the various pigments and respective corrosion inhibitor in a mixture comprising a resinous polyol, dispersants, ANTI-TERRA® U-100, and solvents to give a pre-mill mixture of about 78% total solids. The mixture was then milled with a Lau 200 Disperser for 180 minutes and demonstrated a Hegman value of greater than 6, as determined by ASTM D1210-05. The mixture was agitated and letdown with the microgel, polybutylacrylate, EPON® 1001F, SILQUEST® A-187, ZOLDINE® MS-PLUS, and solvents to provide a coating composition with about 65% total solids.

Example 5

Corrosion Resistance Evaluation

The coating compositions of Examples 3 and 4 were each sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. After an appropriate flash time, a two component urethane/isocyanate (SPECTRACRON®, a 2K topcoat available from PPG Industries) topcoat was applied over each coating. The coating systems were subjected to a 10 minute flash time, cured at 180° F. for 30 minutes, and then post-cured for one week at ambient conditions.

The coated panels were scribed down to the metal substrate and then exposed to an ASTM B117-11 salt-fog cabinet for 500 hours. After the 500 hour salt-fog exposure time, each panel was scraped at the scribe according to the guidelines provided in ASTM D1654-08 and measured in millimeters for corrosion creep at the scribe. The average corrosion creep results are shown in Table 4.

TABLE 4

| First Coating Layer used with Urethane Topcoat | Panel 1 Corrosion Creep (mm) | Panel 2 Corrosion Creep (mm) |
|---|---|---|
| Example 3 coating | 1.54 | 1.28 |
| Example 4 coating | 2.06 | 1.40 |

As shown in Table 4, the multi-layered coating systems comprising a corrosion inhibitor, according to the present invention, exhibited good corrosion resistance when tested according to ASTM D1654-08.

Examples 6-9

Preparation of Coating Compositions and Corrosion Inhibitors In-Situ

Various coating compositions were prepared from the components listed in Table 5.

TABLE 5

| Component | Comparative Example 6 (grams) | Comparative Example 7 (grams) | Example 8 (grams) | Example 9 (grams) |
|---|---|---|---|---|
| 2-Hydroxy-3-methoxy-benzaldehyde | 0 | 0.55 | 0.59 | 0 |
| 2-Hydroxy-4-methoxy-benzophenone | 0 | 0 | 0 | 0.59 |
| MONARCH® 1300 [2] | 0.05 | 0.05 | 0.05 | 0.05 |
| TIONA® 595 [3] | 10.95 | 10.32 | 10.95 | 10.94 |
| ASP® 200 Kaolin [4] | 3.48 | 3.28 | 3.48 | 3.48 |
| BARTEX® 10 [5] | 15.68 | 15.92 | 15.68 | 15.67 |
| HEUCOPHOS® ZP-10 [6] | 5.93 | 11.20 | 5.93 | 5.93 |
| MAGCHEM® 200AD [17] | 6.45 | 0 | 6.45 | 6.45 |
| SILQUEST® A-187 [7] | 0.60 | 0.55 | 0.60 | 0.60 |
| ANTI-TERRA® U-100 [8] | 0.10 | 0.10 | 0.10 | 0.10 |
| NUOSPERSE® 657 [9] | 0.36 | 0 | 0.36 | 0.36 |
| Dispersant [18] | 0 | 0.38 | 0 | 0 |
| Polyester polyol [10] | 11.09 | 10.01 | 10.62 | 10.62 |
| EPON® 1001F [11] | 1.95 | 1.84 | 1.95 | 1.95 |
| DABCO® T-12 [19] | 0 | 0.02 | 0 | 0 |
| Polybutylacrylate | 0.16 | 0.15 | 0.16 | 0.16 |
| Acrylic Microgel [12] | 2.85 | 2.69 | 2.85 | 2.85 |
| SILQUEST® A-1110 [1] | 0.60 | 0.56 | 0.60 | 0.60 |
| ZOLDINE® MS-PLUS [13] | 1.95 | 1.84 | 1.95 | 1.95 |
| Isobutyl alcohol | 0.10 | 0.10 | 0.10 | 0.10 |
| Methyl acetate | 9.71 | 10.81 | 9.71 | 9.71 |
| Tertiary butyl acetate | 7.53 | 10.86 | 7.53 | 7.53 |
| Butyl acetate | 6.51 | 6.03 | 6.51 | 6.51 |
| PM acetate [16] | 1.28 | 1.15 | 1.28 | 1.28 |
| Methyl amyl ketone | 1.28 | 1.15 | 1.28 | 1.28 |
| Acetone | 6.31 | 5.89 | 6.05 | 5.27 |
| GXH-1080 [14] | 6.05 | 5.70 | 6.05 | 6.05 |

[17] Magnesium oxide available from Martin Marietta Magnesia Specialties.
[18] Block polyacrylate copolymer pigment dispersant.
[19] Catalyst (dibutyltin dilaurate) available from Air Products.

Each of the coating compositions listed in Table 5 were prepared by dispersing the various pigments in a mixture comprising a resinous polyol, dispersants, ANTI-TERRA® U-100, and solvents to give a pre-mill mixture of about 78% total solids. The mixture was then milled with a Lau 200 Disperser for 180 minutes and demonstrated a Hegman value of greater than 6, as determined by ASTM D1210-05. After milling, SILQUEST® A-1110 and, in examples 7-9, the aldehyde or ketone component was added to the milled mixture. The mixture was agitated and letdown with the microgel, polybutylacrylate, EPON® 1001F, SILQUEST® A-187, ZOLDINE® MS-PLUS, and solvents to provide a coating composition with about 65% total solids.

Example 10

Corrosion Resistance Evaluation

Each of the coating compositions of Examples 6-9 were sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. After an appropriate flash time, a two component urethane/isocyanate topcoat (SPECTRACRON®, a 2K topcoat available from PPG Industries) was applied over each coating. The coating systems were subjected to a 10 minute flash time, cured at 180° F. for 30 minutes, and then post-cured for one week at ambient conditions.

The coated panels were scribed down to the metal substrate and then exposed to an ASTM B117-11 salt-fog cabinet for 500 hours. After the 500 hour salt-fog exposure time, each panel was scraped at the scribe according to the guidelines provided in ASTM D1654-08 and measured in millimeters for corrosion creep at the scribe. The average corrosion creep results are shown in Table 6.

TABLE 6

| First Coating Layer used with Urethane Topcoat | Panel 1 Corrosion Creep (mm) | Panel 2 Corrosion Creep (mm) |
|---|---|---|
| Comparative Example 6 coating | 2.49 | 2.86 |
| Comparative Example 7 coating | 7.97 | 4.43 |
| Example 8 coating | 1.67 | 1.22 |
| Example 9 coating | 2.19 | 2.00 |

As shown in Table 6, the coatings formed from the compositions of Examples 8 and 9, which were prepared with either an aldehyde or ketone component, provided better corrosion resistance than the coating formed from the composition of Comparative Example 6, which did not include an aldehyde or ketone component. Further, the coating formed from the composition of Example 8, which was also prepared with an inorganic alkaline earth metal compound (magnesium oxide), provided better corrosion resistance than the coating formed from the composition of Comparative Example 7, which was prepared with the same aldehyde component but not with an inorganic alkali or alkaline earth metal compound.

Examples 11-16

Evaluation of Aldehyde Components

Various coating compositions comprising the same inorganic alkaline earth metal compound (magnesium oxide) but different aldehyde components were prepared according to Example 8. The aldehyde components used with each composition are shown in Table 7.

TABLE 7

| Component | Example 11 (grams) | Example 12 (grams) | Example 13 (grams) | Example 14 (grams) | Example 15 (grams) | Example 16 (grams) |
|---|---|---|---|---|---|---|
| 2-Hydroxy benzaldehyde | 0.59 | 0 | 0 | 0 | 0 | 0 |
| 2-hydroxy-1-napthaldehyde | 0 | 0.59 | 0 | 0 | 0 | 0 |
| 2-Hydroxy-3-methoxy benzaldehyde | 0 | 0 | 0.59 | 0 | 0 | 0 |
| 2-Hydroxy-3-ethoxy benzaldehyde | 0 | 0 | 0 | 0.59 | 0 | 0 |
| 2-Hydroxy-4-methoxy benzaldehyde | 0 | 0 | 0 | 0 | 0.59 | 0 |
| 3-methoxy-4-hydroxy benzaldehyde | 0 | 0 | 0 | 0 | 0 | 0.59 |

Each of the coating compositions of Examples 11-16 were sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils, along with a two component urethane/isocyanate (SPECTRACRON®, a 2K topcoat available from PPG Industries) topcoat, and tested for corrosion resistance according to Example 10. The average corrosion creep results are shown in Table 8.

TABLE 8

| First Coating Layer used with Urethane Topcoat | Panel 1 Corrosion Creep (mm) | Panel 2 Corrosion Creep (mm) |
|---|---|---|
| Example 11 coating | 1.68 | 2.35 |
| Example 12 coating | 1.66 | 1.68 |
| Example 13 coating | 1.67 | 1.22 |
| Example 14 coating | 0.37 | 0.54 |
| Example 15 coating | 2.01 | 1.62 |
| Example 16 coating | 1.35 | 1.33 |

As shown in Table 8, the coatings formed from the compositions of Examples 11-16 provided acceptable corrosion resistance in accordance with the present invention.

Examples 17-18

Evaluation of Ratios

Two (2) coating compositions comprising different amounts of an inorganic alkaline earth metal compound (magnesium oxide) were prepared according to Example 8 from the components listed in Table 9.

TABLE 9

| Component | Example 17 (grams) | Example 18 (grams) |
|---|---|---|
| 2-Hydroxy-3-methoxybenzaldehyde | 0.59 | 0.59 |
| MONARCH ® 1300 [2] | 0.04 | 0.05 |
| TIONA ® 595 [3] | 11.04 | 10.94 |
| ASP ® 200 Kaolin [4] | 3.50 | 3.48 |
| BARTEX ® 10 [5] | 15.75 | 15.67 |
| HEUCOPHOS ® ZP-10 [6] | 8.94 | 5.93 |
| MAGCHEM ® 200AD [17] | 3.24 | 6.45 |

TABLE 9-continued

| Component | Example 17 (grams) | Example 18 (grams) |
|---|---|---|
| SILQUEST ® A-187 [7] | 0.59 | 0.59 |
| ANTI-TERRA ® U-100 [8] | 0.10 | 0.10 |
| NUOSPERSE ® 657 [9] | 0 | 0.36 |
| Dispersant [18] | 0.40 | 0 |
| Polyester polyol [10] | 10.66 | 10.62 |
| EPON ® 1001F [11] | 1.96 | 1.95 |
| DABCO ® T-12 [19] | 0.02 | 0 |
| Polybutylacrylate | 0.16 | 0.16 |
| Acrylic Microgel [12] | 2.86 | 2.85 |
| SILQUEST ® A-1110 [1] | 0.60 | 0.60 |
| ZOLDINE ® MS-PLUS [13] | 1.96 | 1.95 |
| Isobutyl alcohol | 0.10 | 0.10 |
| Methyl acetate | 9.56 | 9.71 |
| Tertiary butyl acetate | 6.87 | 7.53 |
| Butyl acetate | 6.54 | 6.51 |
| PM acetate [16] | 1.28 | 1.28 |
| Methyl amyl ketone | 1.28 | 1.28 |
| Acetone | 5.88 | 5.27 |
| GXH-1080 [14] | 6.07 | 6.05 |

Each of the coating compositions of Examples 17 and 18 were sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils, along with a two component urethane/isocyanate (SPECTRACRON®, a 2K topcoat available from PPG Industries) topcoat, and tested for corrosion resistance according to Example 10. The average corrosion creep results are shown in Table 10.

TABLE 10

| First Coating Layer used with Urethane Topcoat | Panel 1 Corrosion Creep (mm) | Panel 2 Corrosion Creep (mm) |
|---|---|---|
| Example 17 coating | 1.77 | 1.93 |
| Example 18 coating | 1.42 | 1.13 |

As shown in Table 10, the coatings formed with the compositions of Examples 17 and 18, which had a molar ratio of the aldehyde to magnesium of 0.05:1 and 0.025:1, respectively, provided good corrosion resistance.

Example 19

Evaluation of an Inorganic Calcium Oxide-Modified Silica Compound

A coating composition was prepared from the components listed in Table 11 and prepared in a similar manner as previously described.

TABLE 11

| Component | Example 19 (grams) |
|---|---|
| 2-Hydroxy-3-methoxybenzaldehyde | 0.60 |
| MONARCH ® 1300 [2] | 0.06 |
| TIONA ® 595 [3] | 11.22 |
| ASP ® 200 Kaolin [4] | 3.57 |
| BARTEX ® 10 [5] | 16.07 |
| HEUCOPHOS ® ZP-10 [6] | 6.08 |
| INHIBISIL ™ 75 [20] | 4.04 |
| SILQUEST ® A-187 [7] | 0.60 |
| ANTI-TERRA ® U-100 [8] | 0.10 |
| NUOSPERSE ® 657 [9] | 0.75 |
| Polyester polyol [10] | 10.64 |
| EPON ® 1001F [11] | 2.00 |
| DABCO ® T-12 [19] | 0.02 |
| Polybutylacrylate | 0.17 |
| Acrylic Microgel [12] | 2.92 |
| SILQUEST ® A-1110 [1] | 0.61 |
| ZOLDINE ® MS-PLUS [13] | 2.00 |
| Isobutyl alcohol | 0.10 |
| Methyl acetate | 9.74 |
| Tertiary butyl acetate | 6.99 |
| Butyl acetate | 6.66 |
| PM acetate [16] | 1.31 |
| Methyl amyl ketone | 1.31 |
| Acetone | 6.39 |
| GXH-1080 [14] | 6.06 |

[20] Calcium oxide-modified silica available from PPG Industries, Inc.

The coating composition of Example 19 was sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils, along with a two component urethane/isocyanate (SPECTRACRON®, a 2K topcoat available from PPG Industries) topcoat, and tested for corrosion resistance according to Example 10. The average corrosion creep results are shown in Table 12.

TABLE 12

| First Coating Layer used with Urethane Topcoat | Panel 1 Corrosion Creep (mm) | Panel 2 Corrosion Creep (mm) |
|---|---|---|
| Example 19 coating | 1.77 | 1.93 |

As shown in Table 12, the coating formed with the composition of Example 19, which was prepared with a calcium oxide-modified silica and an aldehyde component, provided good corrosion resistance.

Example 20

Evaluation of a Zinc Free Coating

A coating composition was prepared from the components listed in Table 13 and prepared in a similar manner as previously described.

TABLE 13

| Component | Example 20 (grams) |
|---|---|
| 2-Hydroxy-3-methoxybenzaldehyde | 0.59 |
| MONARCH ® 1300 [2] | 0.06 |
| TIONA ® 595 [3] | 11.05 |
| ASP ® 200 Kaolin [4] | 3.51 |
| BARTEX ® 10 [5] | 15.83 |
| MAGCHEM ® 200AD [17] | 6.51 |
| BUTROL ® 9119 [21] | 4.04 |
| SILQUEST ® A-187 [7] | 0.59 |
| ANTI-TERRA ® U-100 [8] | 0.10 |
| NUOSPERSE ® 657 [9] | 0.37 |
| Polyester polyol [10] | 10.72 |
| EPON ® 1001F [11] | 1.97 |
| Polybutylacrylate | 0.17 |
| Acrylic Microgel [12] | 2.88 |
| SILQUEST ® A-1110 [1] | 0.60 |
| ZOLDINE ® MS-PLUS [13] | 1.97 |
| Isobutyl alcohol | 0.10 |
| Methyl acetate | 10.20 |
| Tertiary butyl acetate | 7.41 |
| Butyl acetate | 6.57 |
| PM acetate [16] | 1.29 |
| Methyl amyl ketone | 1.29 |
| Acetone | 5.12 |
| GXH-1080 [14] | 6.11 |

[21] Calcium based corrosion inhibitor available from Buckman Laboratories, Inc.

The coating composition of Example 20 was sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils, along with a two component urethane/isocyanate (SPECTRACRON®, a 2K topcoat available from PPG Industries) topcoat, and tested for corrosion resistance according to Example 10. The average corrosion creep results are shown in Table 14.

TABLE 14

| First Coating Layer used with Urethane Topcoat | Panel 1 Corrosion Creep (mm) | Panel 2 Corrosion Creep (mm) |
|---|---|---|
| Example 20 coating | 1.15 | 1.24 |

As shown in Table 14, the coating formed with the composition of Example 20, which was prepared without a zinc component, provided good corrosion resistance.

Example 21

Preparation of Corrosion Resistant Monocoats

The coating compositions of Examples 4, 8, and 9 were sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. The coating compositions were subjected to the same steps previously described, except a two component urethane/isocyanate (SPECTRACRON®, a 2K topcoat available from PPG Industries) topcoat was not applied. Thus, the coating compositions were applied and cured to form a single layer monocoat over cold rolled steel substrates. The average corrosion creep results are shown in Table 15.

TABLE 15

| Coating Layer | Panel 1 Corrosion Creep (mm) | Panel 2 Corrosion Creep (mm) |
| --- | --- | --- |
| Example 4 coating | 1.85 | 1.55 |
| Example 8 coating | 1.44 | 0.99 |
| Example 9 coating | 1.85 | 1.42 |

As shown in Table 15, the single layer monocoats comprising a corrosion inhibitor, according to the present invention, exhibited good corrosion resistance when tested according to ASTM D1654-08.

Example 22

Preparation and Evaluation of a Coating Composition Over Aluminum Alloy

A coating composition was prepared from the components listed in Table 16.

TABLE 16

| Component | Example 22 (grams) |
| --- | --- |
| Component A | |
| ANCAMIDE ® 2569 [22] | 18.4 |
| ANCAMINE ® 2432 [23] | 12.2 |
| ANCAMINE ® K-54 [24] | 1.3 |
| n-butyl alcohol | 24.2 |
| Xylene | 2.9 |
| Ti-Pure ® R-706-11 [25] | 35.0 |
| Corrosion inhibitor of Example 2 | 20.0 |
| Component B | |
| EPON ® 828 [26] | 60.1 |
| EPON ® 8111 [27] | 9.6 |
| Xylene | 1.6 |
| n-butyl acetate | 29.8 |
| MAGLITE ® Y [28] | 35.0 |
| Lithium orthosilicate | 5.0 |
| ACEMATT ® OK 412 [29] | 5.0 |
| Acetone | 16.3 |
| SILQUEST ® A-187 [7] | 1.6 |
| Thinner | |
| Acetone | 7.5 |
| Butanol | 7.5 |
| n-butyl acetate | 7.5 |

[22] Polyamide curing agent, commercially available from Air Products.
[23] Polyamine curing agent, commercially available from Air Products.
[24] Catalyst, commercially available from Air Products.
[25] Titanium dioxide, commercially available from DuPont.
[26] Bisphenol A/epichlorohydrin resin, commercially available from Momentive Performance Materials.
[27] Multi-functional epoxy and acrylate resin, commercially available from Momentive Performance Materials.
[28] Magnesium oxide having an average particle size of 10 micron and a surface area of 55 $m^2$/g, commercially available from Hallstar.
[29] Wax treated precipitated silica, commercially available from Evonik.

For Component A, all materials were weighed into a glass jar. Dispersing media was then added to the jar at a level equal to approximately one half the total weight of the component materials. The jars were sealed with lids and then placed on a Lau Dispersing Unit with a dispersion time of 3 hours. For Component B, all materials with the exception of the ACEMATT® OK 412, the acetone, and the SILQUEST® A-187 were weighed and placed into a glass jar. Dispersing media was then added to the jar at a level equal to approximately the same total weight of the component materials. The jars were sealed with lids and then placed on a Lau Dispersing Unit with a dispersion time of 3 hours. All final dispersions had Hegman gauge values of greater than 7, as determined by ASTM D1210-05. In a separate container, the ACEMATT® OK 412 and acetone were thoroughly mixed together. The silica-acetone mixture was then added to the glass jar containing the Component B resin-solvent-pigment dispersion. The jar was sealed with a lid and then placed on a Lau Dispersing Unit with a dispersion time of 5 minutes. The SILQUEST® A-187 was then added to the Component B mixture after both pigment dispersion processes were completed. The final Component B mixture was then thoroughly mixed. Prior to applying the coating composition, the corresponding ratios of the total Component A, total Component B, and Thinner shown in Table 16 were blended together, thoroughly mixed and given an induction time between 30 and 60 minutes.

Prior to applying the coating composition, 2024T3 bare aluminum alloy substrate panels were cleaned using a methyl ethyl ketone wipe and then processed as outlined in Table 17.

TABLE 17

Alkaline Etch and Nitric Sulfuric Pickle Process

| Step | Process Description | Solution | Time | Temp. |
| --- | --- | --- | --- | --- |
| 1 | Alkaline Clean | Turco Cleaning Solution [30] | 5 minutes | 60-70° C. |
| 2 | Rinse | DI Water | 1 minute | RT |
| 3 | Air Dry | N/A | 0 to 12 hrs | |
| 4 | Alkaline Etch | Alkaline Etch Solution [31] | 3 minutes | RT |
| 5 | Rinse | DI Water | 1 minute | RT |
| 6 | DI Squirt Bottle Rinse | DI Water | N/A | RT |
| 7 | De-smut | 30% Nitric Acid in DI Water | 0.25 to 1 minute | RT |
| 8 | Rinse | DI Water | 1 | RT |
| 9 | Acid Pickle | Nitric Sulfuric Pickle Solution [32] | 8 | 50-60° C. |
| 10 | Rinse | DI Water | 1 | RT |
| 11 | Rinse | DI Water | 1 | RT |
| 12 | DI Squirt Bottle Rinse | DI Water | N/A | RT |
| 13 | Air Dry | N/A | 1 to 3 hours | RT |

[30] The Turco Cleaning Solution was prepared by adding and stirring 48 grams of Turco 4215 NC-LT (alkaline cleaner, commercially available from Henkel) and DI water into a 1000 mL beaker to obtain a 1000 mL solution.
[31] The Alkaline Etch Solution was prepared by adding 612 grams of NaOH bead into a glass vessel which can accommodate 4000 mL and adding DI water into separate container. The DI water was slowly added to the NaOH beads with agitation. The solution was allowed to cool for 15 minutes before adding and mixing 60 mL of Bostex 378 (aqueous dispersion comprising 50% sulfur, available from Akron Dispersions), 40 mL of triethylamine, and 3100 mL of DI water.
[32] The Nitric Sulfuric Pickle Solution was prepared by slowly adding, with agitation, 290 grams of sulfuric acid (93-98%) to a 1000 mL beaker containing 500 mL of DI water, followed by 150 grams of nitric acid (68-70%). Next, 76.75 grams of Iron (III) Sulphate•5H$_2$O was then added and dissolved into the solution. Additional DI water was added to obtain a 1000 mL solution.

The coating composition of Example 22 was spray applied onto the cleaned 2024T3 bare aluminum alloy substrate panels to a dry film thickness of between 1.0 to 1.2 mils using an air atomized spray gun. The coated panels were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117, except that the pH and salt concentration was checked weekly as opposed to daily.

The coated panels were then evaluated for scribe corrosion, shine/nature of the scribe, blisters, and maximum scribe blister size. The scribe corrosion was rated on a scale of 0 to 100 with the number representing the percent of scribe area exhibiting visible corrosion. The shine/nature of the scribe was rated on a scale of 0 to 100 with the number representing the percent of scribe which is dark/tarnished. The blisters represents the total number of blisters adjacent to scribe and away from the scribe (i.e. face) with the blisters being counted up to 30. The maximum scribe blister size refers to the size of the largest blister adjacent to the scribe and was evaluated as followed: 0=no scribe blisters are present; <1.25 mm=largest scribe blister is less than 1.25 mm diameter; >1.25 mm=largest scribe blister is between 1.25 mm and 2.5 mm diameter; and >2.5 mm=largest scribe blister is greater than 2.5 mm diameter.

The results of the various tests are shown in Table 18.

TABLE 18

| Test | Panel 1 | Panel 2 |
| --- | --- | --- |
| Scribe corrosion | 10 | 10 |
| Shine/nature of the scribe | 70 | 70 |
| Scribe blisters | 12 | 13 |
| Face blisters | 0 | 0 |
| Max scribe blister size | <1.25 mm | <1.25 mm |

The test data shown in Table 18 shows that the coating of Example 22, which was prepared with the corrosion inhibitor of the present invention, provided excellent corrosion protection for 2024T3 bare aluminum panels. Evidence of the enhanced corrosion protection is observed in the presence of very little corrosion in the scribe, the presence of some shiny nature to the scribes, and any blistering of the coating along the edge of the scribes being less than 1.25 mm from the scribe edge.

Comparative Examples 23-24

Evaluation of Aldehyde Components

Two (2) coating compositions were prepared according to Example 11, except that the aldehyde component for Comparative Example 23 was benzaldehyde (0.59 grams) or the aldehyde component for Comparative Example 24 was 1-napthaldehyde (0.59 grams).

Each of the coating compositions of Comparative Examples 23-24 were sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils, along with a two component urethane/isocyanate (SPECTRACRON®, a 2K topcoat available from PPG Industries) topcoat, and tested for corrosion resistance according to Example 10. The average corrosion creep results are shown in Table 19. The average corrosion creep results from Examples 11 and 12 are also reproduced in Table 19.

TABLE 19

| First Coating Layer used with Urethane Topcoat | Panel 1 Corrosion Creep (mm) | Panel 2 Corrosion Creep (mm) |
| --- | --- | --- |
| Example 11 coating | 1.68 | 2.35 |
| Example 12 coating | 1.66 | 1.68 |
| Comparative Example 23 coating | 3.24 | 3.73 |
| Comparative Example 24 coating | 3.45 | 3.61 |

As shown in Table 19, the coatings formed from the compositions of Examples 11 and 12 provided better corrosion resistance as compared to Comparative Examples 23-24.

The present invention is also directed to the following clauses.

Clause 1: A corrosion inhibitor comprising: (a) an inorganic alkali and/or alkaline earth metal compound; and (b) an aldehyde and/or ketone component comprising at least one aromatic ring comprising a ketone and/or aldehyde group and at least one pendant group represented by $-OR^1$, wherein each $R^1$ is independently selected from hydrogen, an alkyl group, or an aryl group.

Clause 2: The corrosion inhibitor of clause 1, wherein the ketone group is represented by formula $-C(=O)R^2$ in which $R^2$ is a carbon-containing substituent such as an alkyl group or an aryl group, typically a $C_1$-$C_{30}$ alkyl group, a $C_1$-$C_{20}$ alkyl group, a $C_1$-$C_{10}$ alkyl group, a methyl group, a straight-chained $C_2$-$C_{30}$ alkyl group, a straight-chained $C_2$-$C_{20}$ alkyl group, a straight-chained $C_2$-$C_{10}$ alkyl group, a branched $C_3$-$C_{30}$ alkyl group, a cyclic $C_3$-$C_{19}$ alkyl group, or a phenyl group.

Clause 3: The corrosion inhibitor of any one of clauses 1-2, wherein $R^1$ is independently selected from hydrogen, a $C_1$-$C_{30}$ alkyl group, a $C_1$-$C_{20}$ alkyl group, a $C_1$-$C_{10}$ alkyl group, a methyl group, a straight-chained $C_2$-$C_{30}$ alkyl group, a straight-chained $C_2$-$C_{20}$ alkyl group, a straight-chained $C_2$-$C_{10}$ alkyl group, a branched $C_3$-$C_{30}$ alkyl group, a branched $C_3$-$C_{20}$ alkyl group, a branched $C_3$-$C_{10}$ alkyl group, a cyclic $C_3$-$C_{19}$ alkyl group, and a phenyl group.

Clause 4: The corrosion inhibitor of any one of clauses 1-3, wherein the aldehyde and/or ketone component (b) comprises at least one aromatic $C_6$ ring (benzene ring).

Clause 5: The corrosion inhibitor of clause 4, wherein the aldehyde and/or ketone component (b) comprises a substituted benzaldehyde.

Clause 6: The corrosion inhibitor of clause 4, wherein the aldehyde and/or ketone component (b) comprises a substituted benzophenone.

Clause 7: The corrosion inhibitor of any one of clauses 1-3, wherein the aldehyde and/or ketone component (b) comprises a substituted pyrone, typically a substituted 4-pyrone such as maltol.

Clause 8: The corrosion inhibitor any one of clauses 1-7, further comprising (c) an alkoxysilane.

Clause 9: The corrosion inhibitor of clause 8, wherein the alkoxysilane (c) comprises an epoxy group, amino group, aryl group, vinyl group, alkyl group, or combinations thereof.

Clause 10: The corrosion inhibitor of any one of clauses 8 or 9, wherein the alkoxysilane is a trialkoxysilane, e.g. a trimethoxysilane or a triethoxysilane.

Clause 11: The corrosion inhibitor of any one of clauses 1-10, further comprising (d) an additional metal compound that is different from the inorganic alkali and/or alkaline earth metal compound.

Clause 12: The corrosion inhibitor of clause 11, wherein the additional metal compound (d) includes compounds of zinc, scandium, yttrium, titanium, zirconium, vanadium, molybdenum, tungsten, manganese, iron, aluminum, lead, cerium, praseodymium, neodymium, and combinations thereof.

Clause 13: The corrosion inhibitor of any one of clauses 1-12, wherein the inorganic alkali and/or alkaline earth metal compound (a) comprises an inorganic alkali and/or alkaline earth metal salt.

Clause 14: The corrosion inhibitor of any one of clauses 1-12, wherein the inorganic alkali and/or alkaline earth metal compound (a) comprises an inorganic alkali and/or alkaline earth metal oxide and/or hydroxide.

Clause 15: The corrosion inhibitor of any of clauses 1-14, wherein the inorganic alkali and/or alkaline earth metal compound comprises an inorganic magnesium compound.

Clause 16: The corrosion inhibitor of any of clauses 1-15, wherein the aromatic ring comprises at least two pendant groups represented by —$OR^1$, wherein $R^1$ of a first pendant group is a hydrogen and $R^1$ of a second pendant group is an alkyl group.

Clause 17: The corrosion inhibitor of any of clauses 1-16, wherein the molar ratio of the aldehyde and/or ketone to the alkali and/or alkaline earth metal is 2:1 or less, 1.5:1 or less, 1:1 or less, 0.5:1 or less, 0.1:1 or less, 0.05:1 or less, 0.03:1 or less, 0.02:1 or less, or 0.01:1 or less.

Clause 18: The corrosion inhibitor of any of clauses 1-17, comprising the inorganic alkali and/or alkaline earth metal compound (a), the aldehyde and/or ketone component (b), the optional alkoxysilane (c), and the optional additional metal compound (d) in a total amount of at least 95 weight % or at least 99 weight % or at least 99.5 weight %, based on the total solids weight of the corrosion inhibitor.

Clause 19: The corrosion inhibitor of any of clauses 1-18, wherein the aldehyde and/or ketone component (b) comprises from 1 to 50 weight %, from 5 to 30 weight %, or from 8 to 20 weight % of the corrosion inhibitor, based on the total solids weight of the corrosion inhibitor.

Clause 20: The corrosion inhibitor of any of clauses 1-19, wherein the alkali and/or alkaline earth metal compound (a) comprises from 50 to 99 weight %, from 60 to 95 weight %, or from 70 to 90 weight % of the corrosion inhibitor, based on the total solids weight of the corrosion inhibitor.

Clause 21: The corrosion inhibitor of any of clauses 1-20, wherein the optional alkoxysilane (c) comprises from 1 to 50 weight %, from 5 to 30 weight %, or from 8 to 20 weight % of the corrosion inhibitor, based on the total solids weight of the corrosion inhibitor.

Clause 22: The corrosion inhibitor of any of clauses 1-21, wherein the optional additional metal compound (d) comprises from 1 to 50 weight %, from 5 to 40 weight %, or from 10 to 30 weight % of the corrosion inhibitor, based on the total solids weight of the corrosion inhibitor.

Clause 23: The corrosion inhibitor of any of clauses 1-22, which is solid at 25° C.

Clause 24: The corrosion inhibitor of any of clauses 1-23, which is free of chromium or comprises chromium in an amount of less than 1% by weight, less than 0.01% by weight, or less than 0.001% by weight, based on the total solids weight of the corrosion inhibitor.

Clause 25: A slurry consisting of (A) the corrosion inhibitor according to any one of clauses 1-24 and (e) a liquid medium consisting of an organic solvent and less than 50 weight % of water (including 0 weight % of water), based on the total weight of the liquid medium.

Clause 26: A coating composition comprising: (A) a corrosion inhibitor according to any one of clauses 1-24; and (B) a film-forming resin.

Clause 27: The coating composition of clause 26 comprising from 0.1 to 50 weight %, from 1 to 35 weight %, or from 5 to 20 weight % of corrosion inhibitor (A), based on the total solid weight of the coating composition.

Clause 28: The coating composition of any one of clauses 26 or 27 comprising from 5 to 90 weight %, from 10 to 70 weight %, or from 15 to 50 weight % of the film-forming resin (B), based on the total solid weight of the coating composition.

Clause 29: The coating composition of any one of clauses 26 to 28, wherein the film-forming resin (B) is a thermoplastic resin.

Clause 30: The coating composition of any one of clauses 26 to 28, wherein the film-forming resin (B) is a thermoset resin.

Clause 31: The coating composition of clause 30, further comprising a crosslinking agent reactive (C) with at least the film-forming resin (B).

Clause 32: Use of the corrosion inhibitor of any one of clauses 1-24 to reduce or prevent corrosion of a metal such as steel, including electrogalvanized steel, cold rolled steel, and hot-dipped galvanized steel; aluminum; aluminum alloys; zinc-aluminum alloys; steel coated with a zinc-aluminum alloy, and aluminum plated steel.

Clause 33: Use of clause 32, wherein the corrosion inhibitor is present in a coating composition applied to the metallic substrate.

Clause 34: Use of clause 32, wherein the coating composition is defined as in any one of clauses 26-31.

Clause 35: Use of the coating composition of any one of clauses 32-34 to reduce or prevent corrosion of a metal such as steel, including electrogalvanized steel, cold rolled steel, and hot-dipped galvanized steel; aluminum; aluminum alloys; zinc-aluminum alloys; steel coated with a zinc-aluminum alloy, and aluminum plated steel.

Clause 36: Use of clause 35, wherein the coating composition is applied to the metallic substrate.

Clause 37: A substrate at least partially coated with the coating composition of any one of clauses 26-31.

Clause 38: The substrate of clause 37, wherein the coating composition is applied directly to the substrate as a monocoat.

Clause 39: The substrate of any one of clauses 37 or 38, which is a metal.

Clause 40: The substrate of clause 39, which is selected from steel, including electrogalvanized steel, cold rolled steel, and hot-dipped galvanized steel; aluminum; aluminum alloys; zinc-aluminum alloys; steel coated with a zinc-aluminum alloy, and aluminum plated steel.

Clause 41: A method of preparing the coating composition of any one of clauses 26-31 comprising mixing: (a) an aldehyde and/or ketone component as defined in any one of clauses 1-7 or 16; (b) an inorganic alkali and/or alkaline earth metal compound as defined in any one of clauses 1 or 13-15; and (B) a film-forming resin as defined in any one of clauses 26, 29 or 30, wherein components (a) and (b) form a corrosion inhibitor (A) in-situ.

Clause 42: The method of clause 41, wherein components (a), (b), and (B) are mixed in a non-aqueous media.

Clause 43: The method of any one of clauses 41 or 42, further comprising mixing (c) an alkoxysilane as defined in any one of clauses 8-10 with components (a), (b), and (B).

Clause 44: A multi-layer coating comprising: (1) a first coating layer prepared from the coating composition according to any of clauses 26-31; and (2) a second coating layer applied over the first coating layer and prepared from a coating composition that is different from (1) and which comprises a second film-forming resin.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
(a) a corrosion inhibitor comprising (i) at least one inorganic alkaline earth metal compound, and (ii) at least one aldehyde or ketone component, wherein (i) the inorganic alkaline earth metal compound and (ii) the aldehyde or ketone component form a complex; and
(b) a film-forming resin,
wherein the aldehyde or ketone component comprises at least one aromatic ring in which the at least one aromatic ring comprises: (1) a ketone group, an aldehyde group, or a combination thereof, and (2) at least one pendant group represented by —OR$^1$, wherein each R$^1$ is independently selected from hydrogen, an alkyl group, or an aryl group.

2. The coating composition of claim 1, wherein the film-forming resin comprises a thermoplastic resin.

3. The coating composition of claim 1, wherein the film-forming resin comprises a thermoset resin.

4. The coating composition of claim 3, further comprising a crosslinking agent reactive with at least the film-forming resin.

5. The coating composition of claim 1, wherein the coating composition and/or corrosion inhibitor further comprises an alkoxysilane.

6. The coating composition of claim 5, wherein the alkoxysilane comprises an epoxy group, amino group, aryl group, vinyl group, alkyl group, or combinations thereof.

7. The coating composition of claim 1, wherein the coating composition and/or corrosion inhibitor further comprises an additional metal compound that is different from the inorganic alkaline earth metal compound.

8. The coating composition of claim 1, wherein the inorganic alkaline earth metal compound comprises an inorganic alkaline earth metal salt.

9. The coating composition of claim 1, wherein the inorganic alkaline earth metal compound comprises an inorganic magnesium compound.

10. The coating composition of claim 1, wherein the aromatic ring comprises at least two pendant groups represented by —OR$^1$, wherein R$^1$ of a first pendant group is a hydrogen and R$^1$ of a second pendant group is an alkyl group.

11. The coating composition of claim 1, wherein a molar ratio of the aldehyde component or ketone component to the alkaline earth metal of said inorganic alkaline earth metal compound is 2:1 or less.

12. The coating composition of claim 1, wherein the aldehyde and/or ketone component comprises 2-hydroxy-3-methoxy benzaldehyde.

13. The coating composition of claim 7, wherein the additional metal compound comprises aluminum.

14. A substrate at least partially coated with the coating composition of claim 1.

15. The substrate of claim 14, wherein the coating composition is applied directly to the substrate as a mono-coat.

16. A multi-layer coating comprising:
(a) a first coating layer prepared from a coating composition according to claim 1; and
(b) a second coating layer applied over the first coating layer, the second coating layer prepared from a coating composition that is different from (a) and which comprises a second film-forming resin.

17. A corrosion inhibitor comprising:
(a) at least one inorganic alkaline earth metal compound; and
(b) at least one aldehyde or ketone component,
wherein the aldehyde or ketone component comprises at least one aromatic ring in which the at least one aromatic ring comprises: (1) a ketone group, an aldehyde group, or a combination thereof, and (2) at least one pendant group represented by OR$^1$, wherein each R$^1$ is independently selected from hydrogen, an alkyl group, or an aryl group, and
wherein (a) the inorganic alkaline earth metal compound and (b) the aldehyde or ketone component form a complex.

18. The corrosion inhibitor of claim 17, further comprising an alkoxysilane.

19. The corrosion inhibitor of claim 18, wherein the alkoxysilane comprises an epoxy group, amino group, aryl group, vinyl group, alkyl group, or combinations thereof.

20. The corrosion inhibitor of claim 17, further comprising an additional metal compound that is different from the alkaline earth metal compound.

21. The corrosion inhibitor of claim 17, wherein the inorganic alkaline earth metal compound comprises an inorganic alkali metal salt or alkaline earth metal salt.

22. The corrosion inhibitor of claim 17, wherein the inorganic alkaline earth metal compound comprises an inorganic alkaline earth metal oxide or an inorganic alkaline earth metal hydroxide.

23. The corrosion inhibitor of claim 17, wherein the inorganic alkaline earth metal compound comprises an inorganic magnesium compound.

24. The corrosion inhibitor of claim 17, wherein the aromatic ring comprises at least two pendant groups represented by OR$^1$, wherein R$^1$ of a first pendant group is a hydrogen and R$^1$ of a second pendant group is an alkyl group.

25. The corrosion inhibitor of claim 17, wherein the molar ratio of the aldehyde component or ketone component to the alkaline earth metal of said inorganic alkaline earth metal compound is 2:1 or less.

26. A method of preparing a coating composition comprising mixing:
(a) a corrosion inhibitor comprising (i) at least one aldehyde or ketone component, and (ii) at least one inorganic alkaline earth metal compound, wherein (i) the aldehyde or ketone component and (ii) the inorganic alkaline earth metal compound form a complex; and
(b) a film-forming resin,
wherein the aldehyde or ketone component comprises at least one aromatic ring in which the at least one aromatic ring comprises: (1) a ketone group, an aldehyde group, or a combination thereof, and (2) at least one pendant group represented by —OR$^1$, wherein each R$^1$ is independently selected from hydrogen, an alkyl group, or an aryl group.

27. The method of claim 26, wherein components (a) and (b) are mixed in a non-aqueous media.

28. The method of claim 26, further comprising mixing an alkoxysilane with components (a) and (b).

* * * * *